United States Patent [19]

Fujimori

[11] Patent Number: 4,480,881
[45] Date of Patent: Nov. 6, 1984

[54] BEARING DEVICE
[75] Inventor: Tohru Fujimori, Tokyo, Japan
[73] Assignee: Sony Corporation, Tokyo, Japan
[21] Appl. No.: 380,996
[22] Filed: May 21, 1982
[30] Foreign Application Priority Data Jun. 10, 1981 [JP] Japan .................. 56-85436[U]

[51] Int. Cl.³ .................. F16C 35/06; H02K 5/173
[52] U.S. Cl. ........................... 310/90; 384/446; 384/613
[58] Field of Search ............. 308/176, 182, 184 R, 308/189 R, 189 A, 190, 227, 230; 310/90

[56] References Cited
U.S. PATENT DOCUMENTS

| 2,457,537 | 12/1948 | Douglass | 308/174 X |
| 3,097,539 | 7/1963 | Opocensky | 308/176 X |
| 3,900,232 | 8/1975 | Rode | 308/189 A X |
| 3,943,803 | 3/1976 | Hafla | 308/189 A X |

FOREIGN PATENT DOCUMENTS 851672  7/1981  U.S.S.R. ........................ 310/90

Primary Examiner—Stuart S. Levy
Assistant Examiner—Thomas Hannon
Attorney, Agent, or Firm—Lewis H. Eslinger; Alvin Sinderbrand

[57] ABSTRACT

A rotary member embodying the rotor of a brushless DC motor and having a magnet extending around an axially opening recess is rotatably supported by means of a bearing device on a stationary member which includes a fixed shaft extending into the recess and stator windings arrayed around the fixed shaft on a stator yoke axially confronting the magnet of the rotor to provide a magnetic attraction therebetween constituting at least part of a thrust load; such bearing device comprising first and second ball bearings having outer ring races engaging a cylindrical side wall of the recess in the rotary member and seating against axially spaced first and second annular shoulders, respectively, formed in such side wall and facing axially toward the opening of the recess, while inner ring races of the first and second ball bearings are disposed on the fixed shaft with one of the inner races seating against an additional annular shoulder formed on the shaft and facing axially opposite to the first and second shoulders, and a helical compression spring on the fixed shaft between the inner ring races for axially pre-loading the first and second ball bearing and distributing the thrust load therebetween.

8 Claims, 4 Drawing Figures

BEARING DEVICE

BACKGROUND OF THE INVENTION

1. Field of the Invention

This invention relates to a bearing device for relatively rotatably supporting rotary and stationary members and transmitting a thrust load therebetween, and more particularly is directed to a bearing device, as aforesaid, comprised of two axially spaced ball bearings.

2. Description of the Prior Art

It has been known to provide a bearing device by which the rotor of a brushless DC motor is rotatably supported in respect to the stator, and which is comprised of two axially spaced apart ball bearings which are pre-loaded in the axial direction for eliminating play between the balls of each bearing and the respective races. However, in the known bearing device, a thrust load to be transmitted from one to the other of the rotor and stator is not distributed between the two ball bearings. Rather, one of the ball bearings is subject to a relatively large thrust load which requires the use therefor of a relatively large-size ball bearing. Thus, miniaturization of the apparatus containing the brushless DC motor is thwarted. Further, the known bearing device employs a relatively large number of component parts and requires the performance of difficult assembling steps so that the cost thereof is relatively high.

OBJECTS AND SUMMARY OF THE INVENTION

Accordingly, it is an object of this invention to provide a bearing device for relatively rotatably supporting rotary and stationary members, such as, the rotor and stator of a brushless DC motor, and transmitting a thrust load therebetween, and which is free of the previously discussed disadvantages of the prior art.

More specifically, it is an object of this invention to provide a bearing device for relatively rotatably supporting rotary and stationary members and transmitting a thrust load therebetween, and which permits the use of relatively small ball bearings for that purpose.

Another object is to provide a bearing device, as aforesaid, comprised of two axially spaced ball bearings between which the thrust load is distributed.

Still another object of this invention is to provide a bearing device, as aforesaid, which is made up of a reduced number of parts capable of relatively simple assembly so as to reduce the cost thereof.

In accordance with an aspect of this invention, a bearing device for relatively rotatably supporting rotary and stationary members and transmitting a thrust load therebetween comprises first and second ball bearings each including inner and outer ring races having radially confronting annular grooved surfaces, and balls between said ring races in rolling contact with said grooved surfaces, one of the rotary and stationary members having axially spaced first and second annular shoulders facing axially in one direction with one of the ring races of the first and second ball bearings, respectively, seated thereagainst, the other of the rotary and stationary members having an additional annular shoulder facing axially in opposition to the direction of the first and second annular shoulders and having the other of the ring races of the first ball bearings seated thereagainst, and yieldable means, such as a helical compression spring, interposed between said other ring race of the first ball bearing and the other of said ring races of the second ball bearing for urging said other ring races axially apart and thereby pre-loading said ball bearings for distributing the thrust load therebetween.

In a preferred embodiment of the invention, the rotary member has an axially opening recess and the above mentioned first and second annular shoulders are formed in a wall surface of such recess and face in the axial direction in which the recess opens, the outer ring races of the first and second ball bearings are press-fitted in such recess to seat against the first and second shoulders, and the stationary member includes a fixed shaft having the additional shoulder extending therearound, with the inner ring races of the ball bearings being disposed on the fixed shaft with a helical compression spring therebetween to form the yieldable means by which the ball bearings are pre-loaded.

The above, and other objects, features and advantages of the invention, will be apparent in the following detailed description of an illustrative embodiment thereof which is to be read in connection with the accompanying drawings.

DESCRIPTION OF THE PREFERRED EMBODIMENT

Figure 1:
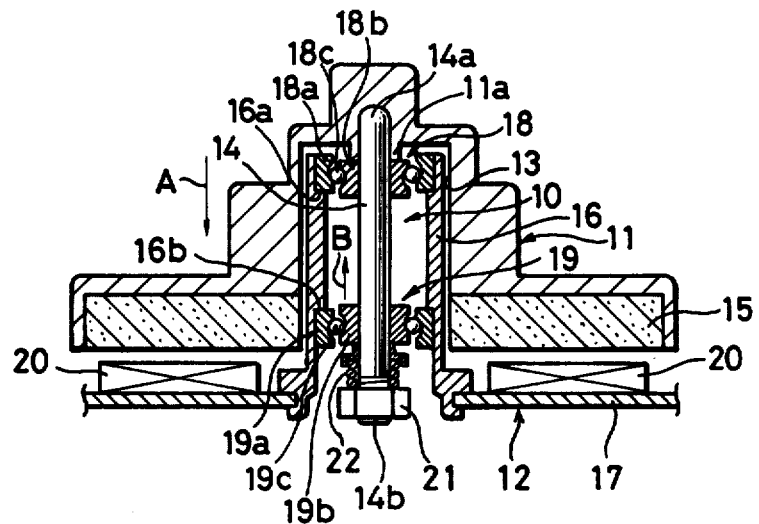
FIG. 1 is a vertical sectional view of a bearing device for rotatably supporting a reel mount in a direct drive type VTR having a brushless DC motor associated with the reel mount.

Before proceeding with the description of the present invention, detailed reference will be made to FIG. 1 which shows a bearing device 10 according to the prior art for rotatably supporting a rotary member 11 in respect to a stationary member 12 and for transmitting a thrust load therebetween. More particularly, in FIG. 1, the rotary member 11 is shown to be in the form of a supply or take-up reel mount of a VTR (video tape recording and/or reproducing apparatus) directly driven by means of a brushless DC motor having its rotor as part of rotary member 11 and a stator included in stationary member 12. Rotary member 11 is shown to have a cylindrical recess 13 opening axially downward, and a central shaft 14 extending coaxially in recess 13 and having its upper end portion 14a press-fitted or otherwise secured in the hub of rotary member 11. A ring-shaped magnet 15 is suitably secured in an annular recess at the bottom of rotary member 11 so as to extend about the opening of recess 13, and such magnet 15 is magnetized so as to present alternately different polarities at equally spaced apart intervals in the circumferential direction. The stationary member 12 includes a cylindrical bearing housing 16 suitably secured, at its lower end, to a base plate 17 which may be desirably formed of sheet iron so as to form a stator yoke. The cylindrical bearing housing 16 is dimensioned to extend axially in recess 13 with clearance therebetween and houses ball bearings 18 and 19 at the upper and lower portions, respectively, of bearing housing 16 for rotatably supporting shaft 14 therein. A plurality of stator windings or coils 20 are suitably secured in a circular array on stator yoke 17 so as to be opposite to, or confront magnet 15 of the rotor.

Ball bearing 18 is shown to include an outer ring race 18a and an inner ring race 18b having radially confronting annular grooved surfaces, and balls 18c disposed between ring races 18a and 18b and in rolling contact with the grooved surfaces thereof. Similarly, ball bearing 19 includes outer and inner ring races 19a and 19b having radially confronting annular grooved surfaces, and balls 19c between such ring races in rolling contact with the grooved surfaces thereof. The outer races 18a and 19a of ball bearings 18 and 19 are press-fitted into counter-bored opposite end portions of cylindrical bearing housing 16 and respectively seat against annular shoulders 16a and 16b which face axially in opposite directions. Shaft 14 is slidably extended through inner ring races 18b and 19b, and the lower end portion of shaft 14 is threaded, as at 14b, to receive a nut 21 with a helical compression spring 22 being interposed axially between nut 21 and inner race 19b of the lower ball bearing 19.

A thrust load indicated by the arrow A on FIG. 1 results from the weight of rotary member 11 including magnet 15 therein and any object carried thereby and also from a magnetic attraction established between magnet 15 and stator yoke 17 carrying windings 20. Such thrust load is applied from a boss 11a at the top of recess 13 in rotary member 11 to inner ring race 18b of ball bearing 18, with the result that inner ring race 18b is offset downwardly relative to outer ring race 18a to take up any play between races 18a and 18b and balls 18c. On the other hand, spring 22 urges inner ring race 19b of ball bearing 19 axially in the direction of arrow B on FIG. 1, that is, in the axial direction opposed to the direction of the thrust load, so that ball bearing 19 is pre-loaded to offset its inner ring race 19b upwardly relative to outer ring race 19a for taking up any play between races 19a and 19b and balls 19c. Thus, in bearing device 10, play is eliminated from both ball bearings 18 and 19 for ensuring accurate, vibration-free rotational mounting of rotary member 11 relative to stationary member 12.

However, in the described bearing device 10 according to the prior art, the reaction to the force B of spring 22 for taking-up play in bearing 19 is applied through nut 21 and shaft 14 to rotary member 11 and, from the latter, through boss 11a to the inner ring race 18b of bearing 18. Thus, ball bearing 18 is subjected to the entire thrust load indicated at A and also to an additional axial force or load, in the same direction, which corresponds to the force of compression spring 22 for pre-loading bearing 19. By reason of such increased axial load or thrust on ball bearing 18, at least that ball bearing must be of a larger size than would otherwise by necessary, with the result that the overall dimensions of bearing device 10 are undesirably large. Further, in producing the bearing device 10 according to the prior art, after the shaft 14 of rotary member 11 has been axially inserted into the inner races 18b and 19b of ball bearings 18 and 19 installed in bearing housing 16 on stationary member 12, it is necessary to mount compression spring 22 on shaft 14 and then fit nut 21 on the threaded end portion 14b of the shaft. By reason of the foregoing, the number of components included in bearing device 10, and also the number of steps required for the assembly thereof are undesirably high, thereby contributing to a relatively high cost of the bearing device.

Figure 3:
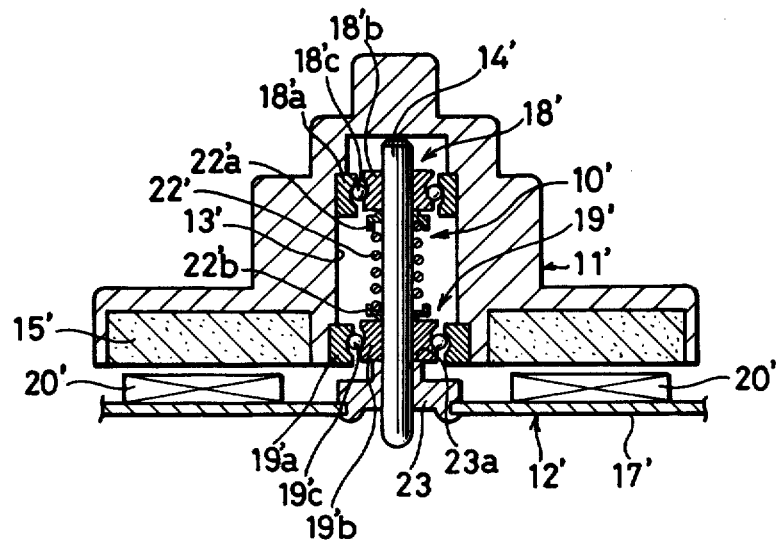
FIG. 3 is a vertical sectional view similar to that of FIG. 1, but showing the bearing device according to this invention.
Figure 2:
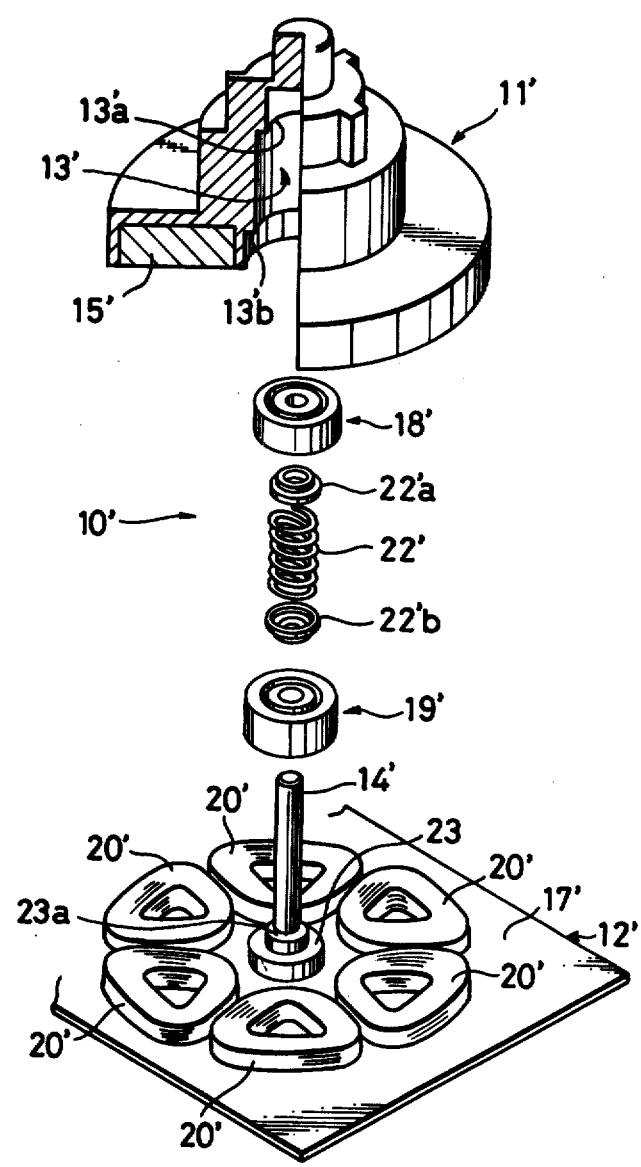
FIG. 2 is an exploded perspective view of a bearing device according to the present invention for a reel mount in a direct-drive type VTR having a similar brushless DC motor.

Referring now to FIGS. 2 and 3, in which parts corresponding to those described above with reference to FIG. 1 are identified by the same reference numerals, but with a prime (′) appended thereto, it will be seen that the present invention is there shown embodied in a bearing device 10′ of a brushless DC motor for driving a reel mount in a direct drive type VTR. Although FIGS. 2 and 3 show a single rotary member 11′ in the form of a reel mount, for example, for supporting a take-up reel, which is rotatably supported by means of bearing device 10′ on a stationary member 12′ which constitutes the stator yoke 17′ of a brushless DC motor for driving the take-up reel mount 11′, the stationary member 12′ may also form the stator yoke of another brushless DC motor for driving a similarly rotatably mounted supply reel mount (not shown).

The illustrated rotary member 11′ in the form of a reel mount is desirably molded of a synthetic resin and has a recess 13′ opening axially downward and provided with a stepped cylindrical wall defining upper and lower annular shoulders 13′a and 13′b, respectively, which face downwardly, that is, in the axial direction in which recess 13′ opens. In the illustrated embodiment of the invention, bearing device 10′ serves to rotatably support rotary member 11′ on shaft 14′ which extends perpendicular to stator yoke 17′ and which is fixed to the latter, at the lower end of shaft 14′, by means of a boss 23. Such boss 23 defines an additional annular shoulder 23a at the lower end portion of fixed shaft 14′ and facing axially upward, that is, in the axial direction opposed to shoulders 13′a and 13′b. Thus, fixed shaft 14′ is included in stationary member 12′.

Once again, rotary member 11′ has a ring-shaped magnet 15′ recessed in its lower surface about the opening of recess 13′ for cooperation with a circular array of stator coils or windings 20′ which are suitably secured on stator yoke 17′ about the respective boss 23.

The bearing device 10′ is shown to include a relatively small diameter ball bearing 18′ having outer and inner ring races 18′a and 18′b with radially confronting annular grooved surfaces with which balls 18′c are in rolling contact, and a relatively large diameter ball bearing 19′ also having outer and inner ring races 19′a and 19′b with radially confronting annular grooved surfaces with which balls 19′c are in rolling contact. The outer ring races 18′a and 19′a are press-fitted against respective portions of the stepped cylindrical side wall surface of recess 13′ and seat against first and second shoulders 13′a and 13′b, respectively, as shown particularly on FIG. 4, so as to be securely fixed in respect to rotary member 11′. Further, shaft 14′ which is fixed relative to stator yoke 17′ so as to be included in stationary 12′ extends axially upward in recess 13′ and is axially slidable in inner ring races 18′b and 19′b, with inner ring race 19′b seating on an additional shoulder 23a which faces upwardly, that is, in the opposite axial direction to shoulders 13′a and 13′b. A helical compression spring 22′ extends around fixed shaft 14′ between ball bearings 18′ and 19′ and acts, at its opposite ends, on inner race rings 18′b and 19′b through annular spring shoes 22′a and 22′b, respectively.

Figure 4:
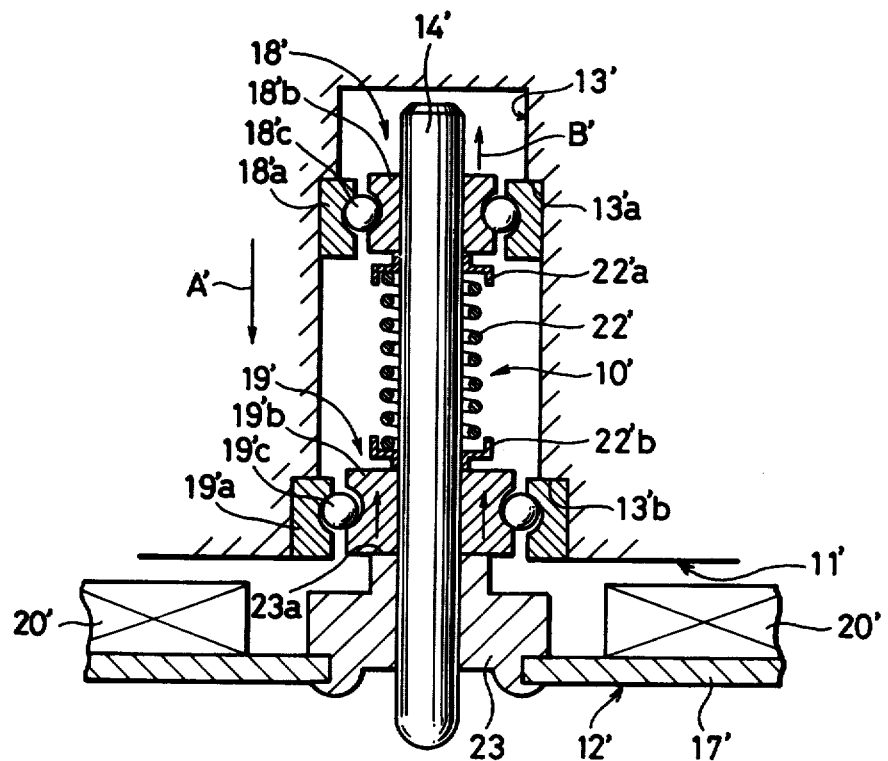
FIG. 4 is an enlarged vertical sectional view of the essential components of the bearing device according to this invention, and to which reference will be particularly made in explaining distribution of the thrust load among the ball bearings.

As shown particularly on FIG. 4, the weight of reel mount 11' and of a tape reel thereon together with the magnetic attraction established between magnet 15' and stator yoke 17' produce a downwardly directed thrust load represented by the arrow A'. Such thrust load A' causes outer ring race 19'a to be offset downwardly relative to inner ring race 19'b seating on additional shoulder 23a for eliminating play between races 19'a and 19'b and balls 19'c in rolling contact with the respective annular grooves. Helical compression spring 22', in being interposed between inner ring race 18'b and inner ring race 19'b seating on fixed shoulder 23a, acts axially upward on inner ring race 18'b, for example, as indicated by the arrow B' on FIG. 4, for offsetting inner ring race 18'b upwardly relative to outer ring race 18'a and thereby eliminating any play between balls 18'c and the annular grooves in races 18'a and 18'b. Thus, helical compression spring 22' establishes a pre-loaded state of ball bearing 18'.

It will be appreciated that the upward force applied by spring 22' to inner ring race 18'b is transmitted through balls 18'c to outer ring race 18'a, and thus to rotary member 11' so as to act in opposition to the thrust load A' on member 11'. Spring 22' is desirably dimensioned so that the upward force exerted thereby on inner ring race 18'b is smaller than the magnetic attraction force established between magnet 15' and stator yoke 17', and hence smaller than the thrust load A', whereby to ensure that bearing 19' as well as bearing 18' will remain in the pre-loaded state shown on FIG. 4.

In assembling the bearing device 10' described above with reference to FIGS. 2-4, ball bearing 19', spring shoe 22'b, helical compression spring 22', spring shoe 22'a and bearing 18' may be simply slidably installed in succession, in the order named, on fixed shaft 14' of stationary member 12' and, thereafter, rotary member 11' can be suitably installed over fixed shaft 14' and the previously installed parts thereon for inserting the latter in recess 13. As a result of the foregoing installation of rotary member 11' over fixed shaft 14', outer ring races 18'a and 19'a of ball bearings 18' and 19' are press-fitted into the stepped portions of the cylindrical side wall surface of recess 13' and engaged against the respective shoulders 13'a and 13'b and, at the same time, helical compression spring 22' is loaded or axially contracted for eventually exerting the desired upwardly directed force on inner ring race 18'b, as indicated by the arrow B' on FIG. 4. Thereafter, the magnetic attraction force established by magnet 15' and stator yoke 17', and forming at least part of the thrust load A', is effective to retain rotary member 11' in its rotatably mounted condition on fixed shaft 14' of stationary member 12'.

As earlier noted, in bearing device 10' according to this invention, both ball bearings 18' and 19' are in a pre-loaded state, that is, no play exists between balls 18'c and the respective races 18'a and 18'b, or between balls 19'c and the respective races 19'a and 19'b, and further at least the magnetic attraction force established between magnet 15' and stator yoke 17' and forming part of the thrust load A', is shared between the two ball bearings 18' and 19'. In other words, because spring 22' exerts a force indicated by the arrow B' and applied in the upward direction through bearing 18' to rotary member 11', the amount of the thrust load A' to which bearing 19' is subjected is reduced by the amount of such force B'. Thus, for example, if compression spring 22' is dimensioned so that the axial force exerted thereby in the assembled bearing device 10' is approximately one-half the magnetic attraction force established between magnet 15' and stator yoke 17', then the two ball bearings 18' and 19' will bear approximately equal shares of such attraction force. By reason of the foregoing, the sizes of ball bearings 18' and 19' can be relatively reduced without sacrificing either durability or the capacity of the ball bearings to reliably and efficiently perform their friction-reducing functions.

It is further to be noted that, in the illustrated embodiment, due to the press fitting of the outer ring races 18'a and 19'a of ball bearings 18' and 19' directly into recess 13' of rotary member 11', bearing housing 16 of the prior art device shown on FIG. 1 is not needed so that bearing device 10' according to this invention can be effectively miniaturized. Moreover, as previously described, assembling of rotary member 11' on stationary member 12' by means of bearing device 10' according to this invention merely involves the pressing of ball bearings 18' and 19' into recess 13' after the ball bearings 18' and 19' and the spring 22' and spring shoes 22'a and 22'b therebetween have been simply slidably installed on fixed shaft 14. Thus, the nut 21 and other elements of the prior art device can be omitted to reduce the number of parts making up the bearing device and further to very substantially simplify the assembling thereof.

In the described embodiment of the invention, the shaft 14' is fixed to stationary member 12' and has the inner races of ball bearings 18' and 19' slidable axially on shaft 14' with the spring 22' therebetween, while the outer races of ball bearings 18' and 19' seat against shoulders 13'a and 13'b which face axially in the same direction in rotary member 11' and an additional annular shoulder 23a is formed on the stationary member 12' and faces oppositely to shoulders 13'a and 13'b to provide a seat for one of the inner races, which arrangement achieves distribution of the thrust load between the two bearings and eliminates play therein. However, the invention is not limited to such arrangement, but rather may be alternatively embodied in a bearing device in which the shaft is fixed relative to the rotary member and is provided with axially spaced first and second annular shoulders facing in the same axial direction for seating thereagainst of the inner races of the two ball bearings, respectively, while the stationary member has a recess therein to slidably receive the outer races of the two ball bearings and being formed with an additional annular shoulder facing axially in opposition to the first and second shoulders for seating one of the outer races, and further in which the helical compression spring is interposed between the outer races of the two ball bearings for again achieving the desired distribution of the thrust load therebetween. Further, although a helical compression spring 22' has been shown and described as being interposed between inner races 18'b and 19'b for providing the force B' (FIG. 4) by which the thrust load is distributed, such spring 22' can be replaced by other yieldable or elastic means, such as, a rubber cylinder, interposed between the inner races of ball bearings 18' and 19' for achieving a similar purpose.

Moreover, although the invention has been shown applied to a bearing device 10' for rotatably supporting a reel mounting directly driven by a brushless DC motor in a VTR, it will be appreciated that the invention may also be advantageously applied to the mounting of other rotary members, such as, the capstan in a VTR or audio tape recorder, or the turntable of a record player which, in each instance, may or may not be directly driven, as by a brushless DC motor.

Having described in detail an illustrative embodiment of the invention with reference to the accompanying drawings, and also specific modifications thereof, it is to be understood that the invention is not limited to the specifically described embodiment and modifications, and that various changes and further modifications may be effected therein by one skilled in the art without departing from the scope or spirit of the invention as defined in the appended claims.

What is claimed is:

1. A bearing device for relatively rotatably supporting rotary and stationary members and transmitting a thrust load therebetween, comprising first and second ball bearings each including inner and outer ring races having radially confronting annular grooved surfaces, and balls between said ring races in rolling contact with said grooved surfaces;

said rotary member having an axially opening recess and having axially spaced first and second annular shoulders formed in a wall surface of said recess and facing axially in the direction in which said recess opens, with said outer ring races of said first and second ball bearings, respectively, received in said recess and seated against said first and second shoulders, respectively;

said stationary member having an additional annular shoulder facing axially in opposition to said direction in which said recess opens and having said inner ring race of said first ball bearing seated thereagainst; and yieldable means interposed between said inner ring race of the first ball bearing and the inner ring race of the second ball bearing for urging said inner ring races of said first and second ball bearings axially apart and thereby pre-loading said ball bearings for distributing said thrust load therebetween.

2. A bearing device according to claim 1; in which said yieldable means includes a helical compression spring interposed between said inner ring races of said first and second ball bearings, respectively.

3. A bearing device according to claim 1; in which said stationary member includes a fixed shaft having said additional shoulder extending therearound, said inner ring race of said second ball bearing is axially slidable along said shaft, and said yieldable means includes a helical compression spring extending around said shaft between said inner ring races.

4. A bearing device according to claim 1; in which said outer ring races are press-fitted in said recess of the rotary member.

5. A bearing device according to claim 1; in which said rotary member has a cylindrical surface from which said annular shoulders extend and said outer ring races of said first and second ball bearings are press-fitted against said cylindrical surface.

6. The combination of a rotary member having an axially opening recess formed with a stepped cylindrical side wall defining axially spaced first and second annular shoulders facing axially toward the opening of the recess;

a stationary member including a fixed shaft extending axially into said recess of the rotary member through said opening and having an additional annular shoulder thereon facing axially opposite to said first and second shoulders;

first and second ball bearings each including inner and outer ring races having radially confronting annular grooved surfaces, and balls between said ring races in rolling contact with said grooved surfaces;

said outer ring races of said first and second ball bearings engaging said cylindrical side wall of the recess and seating against said first and second annular shoulders, respectively, said inner ring races of said first and second ball bearings being disposed on said fixed shaft with one of said inner races seating against said additional shoulder; and helical compression spring means on said shaft between said inner ring races of the first and second ball bearings for axially pre-loading the latter and thereby distributing any thrust load therebetween.

7. The combination according to claim 6; in which said outer ring races are press-fitted against said cylindrical side wall of the recess.

8. The combination according to claim 7; in which said rotary member includes a rotor of a brushless DC motor which has a magnet, and said stationary member further includes stator windings on a stator yoke axially confronting said magnet to provide a magnetic attraction therebetween constituting at least part of said thrust load.

* * * * *